United States Patent [19]

Cachat

[11] Patent Number: 5,174,950
[45] Date of Patent: Dec. 29, 1992

[54] GRID FOR NUCLEAR FUEL ASSEMBLY

[75] Inventor: Stéphane Cachat, Lyon, France

[73] Assignee: Compagnie Generale Des Mattieres Nucleaires, Velizy Vi Llacoublay, France

[21] Appl. No.: 697,684

[22] Filed: May 9, 1991

[30] Foreign Application Priority Data

May 10, 1990 [FR] France ............... 90 05820

[51] Int. Cl.⁵ .............................. G21C 3/00
[52] U.S. Cl. .................... 376/462; 376/442; 376/443; 376/438
[58] Field of Search ........... 376/462, 443, 446, 438, 376/441, 442, 439

[56] References Cited

U.S. PATENT DOCUMENTS

| | | | |
|---|---|---|---|
| 4,297,170 | 10/1981 | Leclercq | 376/442 |
| 4,547,335 | 10/1985 | Downs et al. | 376/442 |
| 4,714,585 | 12/1987 | Kast | 376/442 |
| 4,717,533 | 1/1988 | Denizou | 376/441 |
| 4,758,403 | 5/1988 | Noailly | 376/439 |
| 4,775,509 | 10/1988 | Noailly et al. | 376/442 |
| 4,933,138 | 6/1990 | Mouesca et al. | 376/442 |
| 5,002,722 | 3/1991 | Canat et al. | 376/353 |

FOREIGN PATENT DOCUMENTS 0065613 12/1982 European Pat. Off.
1386424 3/1975 United Kingdom.

Primary Examiner—Brooks H. Hunt
Assistant Examiner—Frederick H. Voss
Attorney, Agent, or Firm—Pollock Vande Sande & Priddy

[57] ABSTRACT

A grid for use on a PWR fuel element comprises a belt of hexagonal shape and three sets of plates secured to the belt. The plates in each set are mutually parallel and are at an angle of 120° with the plates of the two other sets. All plates have the same length and have a 120° bend in their middle. Each plate is parallel to two successive faces of the belt.

10 Claims, 3 Drawing Sheets

GRID FOR NUCLEAR FUEL ASSEMBLY

FIELD OF THE INVENTION

The invention relates to nuclear fuel assemblies whose fuel rods are spaced apart at the nodal points of a triangular lattice and it is particularly suitable for use in fuel assemblies for light water cooled and moderated reactors.

BACKGROUND OF THE INVENTION

The fuel assemblies used at the present time in such reactors generally comprise a bundle of fuel rods (this term designating not only rods loaded with fissile material but also those loaded partially or completely with fertile material) and a structure holding the bundle, comprising upper and lower end pieces connected together by guide tubes which carry grids for maintaining the fuel rods at the nodal points of a regular network.

The grids are distributed along the assembly, at sufficiently close intervals to maintain a regular spacing between the fuel rods over their whole length, despite deformations caused by irradiation, and to give a high value to the natural vibration frequencies of the rods between two grids, which avoids energization of dangerous vibratory working conditions by the coolant.

Considered as a whole, the grids must fulfil two other functions:
 supporting rods.
 mixing the flow streams about the fuel rods, so as to avoid the appearance of hot spots.

The first function is generally fulfilled by one and/or the other of the endmost grids, provided with springs for clamping the fuel rods. The other function is fulfilled by at least intermediate grids.

Different types of grids are already known for maintaining the fuel rods at the nodal points of the triangular network.

There is known in particular (FR-A-2594998) a grid comprising a hexagonal shaped belt and three sets of plates fixed to the belt, the plates of each set being mutually parallel and forming an angle of 120° with the plates of the other sets.

In that prior art grid, the plates of one set form a bed spaced apart from the other beds in the longitudinal direction of the assembly. This approach has a number of advantages; on the other hand, since the plates are all parallel to a face of the belt and extend throughout the width of the grid, it is necessary to provide several plate patterns, which considerably complicates the manufacture.

A fuel assembly is also known (FR-A-2145676 or EP-A-0239441) having an external casing extending throughout the assembly, in which structures for holding the rod in position are spaced apart longitudinally at even intervals. Each structure comprises two sets of plates, the plates of one set being parallel to two mutually opposite faces of the case and forming an angle of 120° with those of the other set, so as to define cells having a diamond-shaped section whose axes are distributed in a triangular network. The plates of one set are offset longitudinally with respect to those of the other set and the two sets are fast with the casing. This approach involves the presence of a casing. The structures are not isotropic mechanically. Again the structure comprises a large number of different plates.

SUMMARY OF THE INVENTION

An object of the present invention is to provide a grid of the above-defined type which is simple to manufacture and has a mechanically isotropic structure, and which may comprise only one layer of plates, despite the presence of three sets of plates.

To this end, there is provided a grid wherein all plates of a same set have the same length, are bent at 120° in the middle and are parallel to two successive faces of the belt. The plates of the three sets are advantageously mutually interlocked so as to form a single bed and define cells each to guide a fuel rod, most of the cells being diamond-shaped.

In the case where the grid is used solely for centering and guiding rods, the plates may be arranged so as to be applied directly on the rods. The plates will generally be flat, except when it is desirable to form a very tight network, in which case the plates may be formed with corrugations spaced apart at the same pitch as that of rods.

There is also provided a fuel assembly of hexagonal cross section, having no external casing, which can be used in particular in an undermoderated and/or spectrum variation light water cooled and moderated reactor, whose holding structure is formed of two sub-structures, one of which comprises one of the end pieces (generally the upper end piece), some of the guide tubes, the grid supporting the rods (which is fixed rigidly to the guide tubes of the sub-structure) and grids for centering the rods, and possibly for homogenizing and/or supporting the rods of the kind which has just been described. A distribution in two substructures is described, for example, in documents EP-A-214895 and EP-A-307320, to which reference may be made.

In a fuel assembly, particularly of the type which has just been described, it is advantageous for two successive grids to be angularly offset with respect to each other by 60°, so as to retain the rods homogeneously.

BRIEF DESCRIPTION OF THE DRAWINGS

The invention will be better understood from the following description, in which several embodiments are described by way of example with reference to the accompanying drawings.

SHORT DESCRIPTION OF THE DRAWINGS

Figure 1:
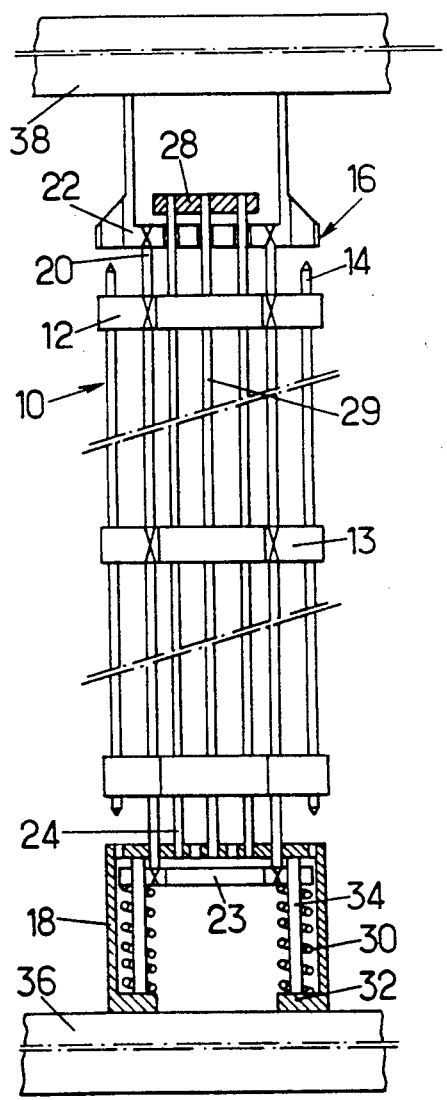
Figure 2:
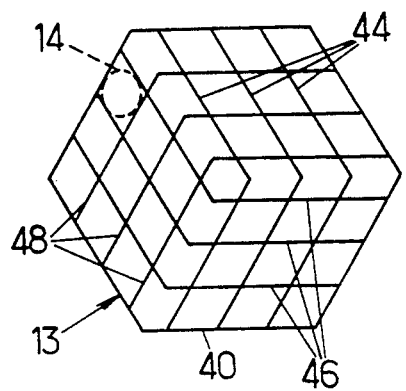
Figure 3:
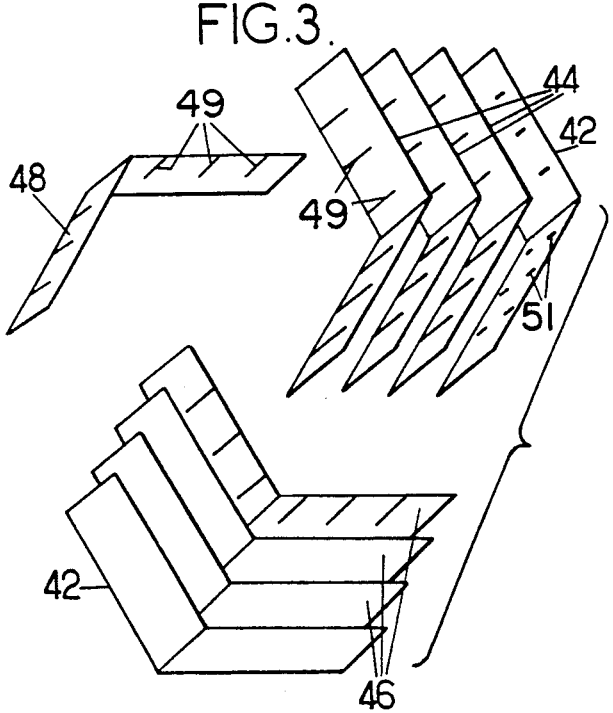
Figure 4:
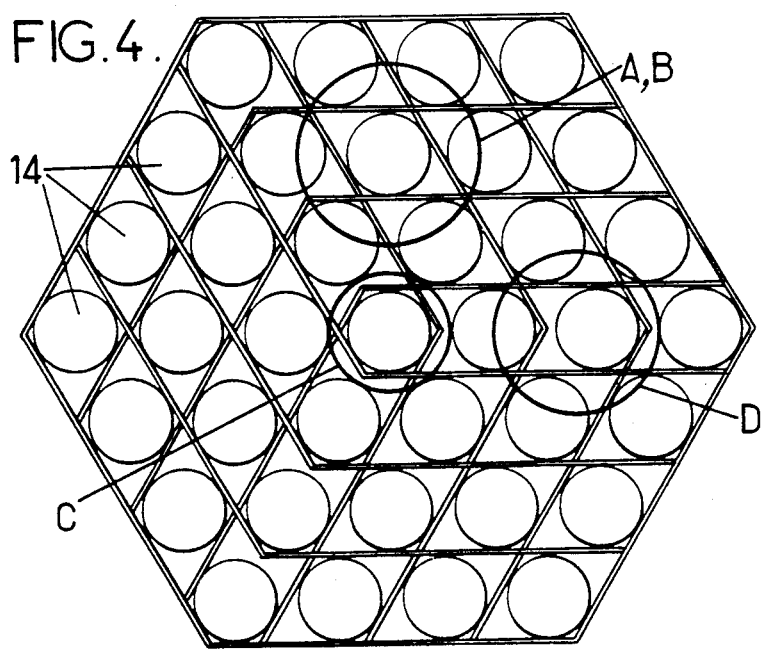
Figure 4A:
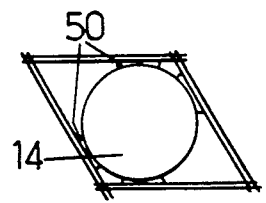
Figure 4B:
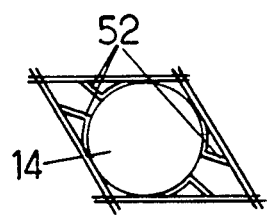
Figure 5A:
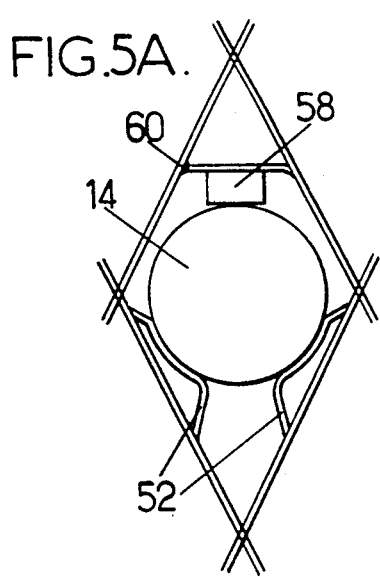
Figure 5B:
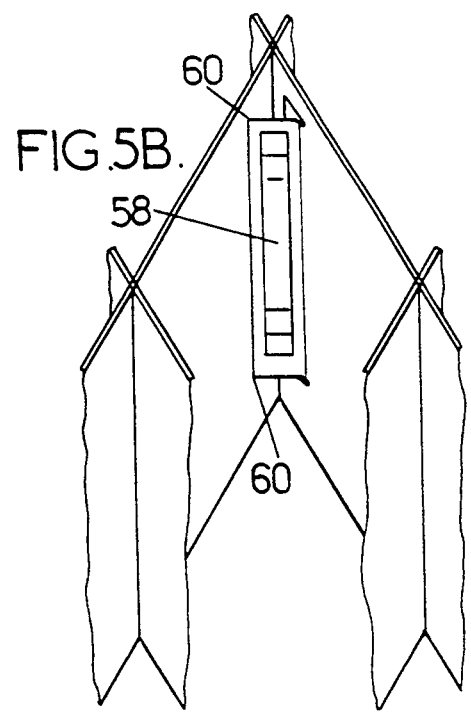
Figure 6:
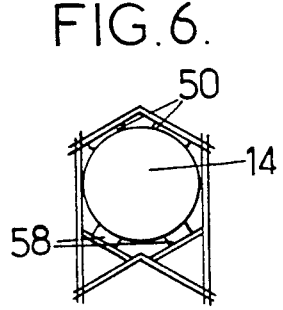
Figure 8:
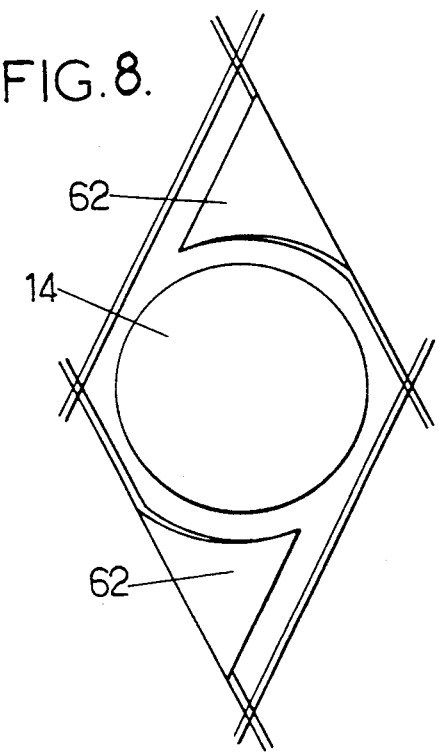
Figure 7:
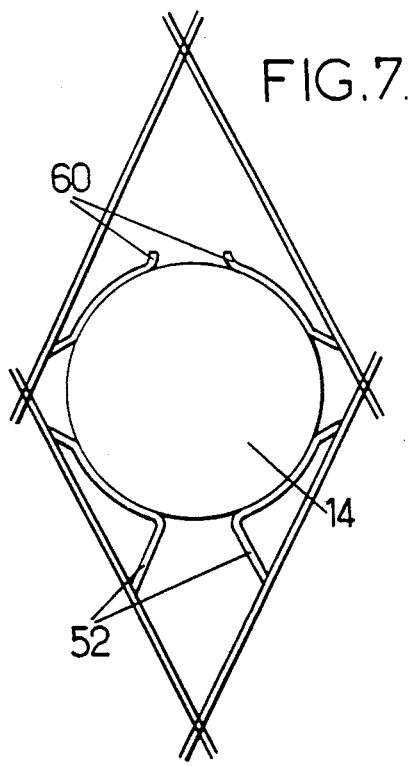
Figure 9:
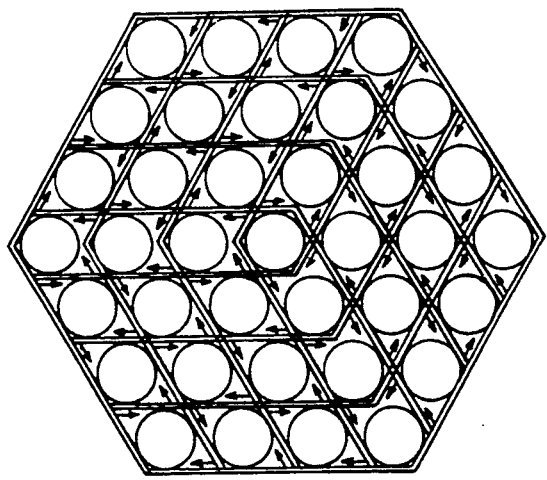

FIG. 1 is a general diagram of a fuel assembly, having two sub-structures, of a pressurized light water moderated and cooled spectrum variation reactor, which may comprise grids in accordance to the invention;

FIG. 2 is a top view of a grid according to a particular embodiment of the invention;

FIG. 3 shows all plates of two of the sets used in the grid of FIG. 2;

FIG. 4 is a schematical top view of a grid according to the invention, for showing the different cell shapes;

FIGS. 4A and 4B show two possible constructions of embossments which may be used in the cell indicated at A, B in FIG. 4; respectively for the cells indicated at C and D in FIG. 4;

FIGS. 5A and 5B show a spring which may be located on diamond-shaped cell, respectively from above and in perspective;

FIG. 6, similar to FIG. 5A, shows an example of a herring-bone cell having springs and embossments;

FIGS. 7, similar to FIG. 5A, shows an possible embodiment of spring;

FIG. 8, similar to FIG. 7, shows one example of fins which may equip a diamond-shaped cell;

FIG. 9 is a schematical top view with arrows showing the orientations of coolant streams which can be obtained using fins of the kind shown in FIG. 8.

DETAILED DESCRIPTION OF PREFERRED EMBODIMENTS

As indicated above, a grid according to the invention can be used in a fuel assembly having a hexagonal cross-section with two sub-structures, such as the assembly 10 shown in FIG. 1, in which only some fuel rods 14 have been shown.

The support structure has two end pieces, an upper end piece 16 and a lower end piece 18, and guide tubes 20 and 24 replacing the rods at certain nodal points of the network of rods. The first sub-structure comprises the guide tubes 20, upper end piece 16 and a plate 23 movable within the lower end piece 18. The guide tubes pass through the bottom wall 22 of the end piece 18, in which they are vertically slidable.

The first sub-structure further comprises the uppermost grid 12, which is intended to carry the fuel rods 14, and for this purpose is provided with means for clamping the fuel rods, i.e., some at least of the intermediate grids 13. The lowermost grid may also be fixed to the guide tubes 20. The connections of the guide tubes 20 of the first sub-structure, of grid 12 and of the bottom wall of the upper end piece 16 are shown by crosses in FIG. 1.

The second sub-structure comprises the lower end piece 18, the other guide tubes 24 and a plate 28 movable vertically in the frame portion of the upper end piece 16, above the bottom wall 22 of piece 16. The guide tubes 24 pass through the bottom wall and are slidable therein. The second sub-structure may also comprise a central instrumentation tube 29.

Springs 30, four in number for example, are placed between the plate 23 and a flange 32 formed at the lower part of the frame of the lower end piece 18. The springs exert a force on plate 23 tending to hold it applied against the bottom wall of plate 18. Rods 34 fixed to the lower end piece 18 guide the springs 30 and the plate 23.

The fuel assemblies have been loaded in the reactor, the lower end piece 18 of each assembly rests on the core support plate 36. Springs 30 support the first sub-structure and hold plate 23 in position.

When the upper core plate 38 is lowered, the pressure which it exerts on the upper end piece 16 is added to the weight of the first sub-structure.

When the reactor is operating, the coolant exerts on the first sub-structure a force which tends to apply the upper end piece 16 against the upper core plate 38. The force which the coolant exerts on the second sub-structure, much smaller than that which it exerts on the first sub-structure, is absorbed by springs 30 without raising the lower end piece 18.

The intermediate grids 13, for holding the rods in position at the nodal points of a triangular network, may be devoid of springs for supporting the rods and may have the construction shown in FIGS. 2 and 3.

Each grid is formed by assembling together a plurality of sets of plates which are all made from an alloy having a low neutron absorption, generally a zirconium-base alloy.

The grid 13 may be regarded as comprising a belt 40 and plates defining cells for receiving respective fuel rods 14, only one of which is shown schematically in FIG. 2. The belt may be formed b a metal strip of zirconium-base alloy which is bent into a hexagonal shape, or by strip sections each having a length equal to that of one side of the belt, the sections being joined together by welding, for example by electron beam or laser beam welding. To reduce the number of types of components, it is however more advantageous to form the belt of three plates 42 having the same shape as the internal plates 44, to which the internal plates are welded or brazed.

The internal plates 44, 46 and 48 belong to three sets crossed at 120° with respect to each other. All plates extend between two opposite faces of the belt and are angled at 120° in the middle. They will in general form a single bed, obtained interlocking plates 44, 46 and 48. To this end, slits 49 whose length is equal to half the width of the plates are formed in the latter. One at least of the sets of plates 44, 46 and 48 has slits directed in opposite directions on opposed sides of the medium bend of the plate. As illustrated, plates 44 are inserted on plates 46 and 48 already assembled. Once interlocked, the plates are secured permanently together, for example by welding points at the intersections, using well-known techniques.

For correct positioning of plates 44, 46 and 48 of the belt, the plates 42 which form the latter may comprise openings 51 receiving lugs (not shown) projecting from the end edges of plates 44, 46 and 48.

As mentioned above, the plates may be provided with means for bearing rigidly or resiliently on the rods.

Such bearing means may be embossments formed by press-shaping the plates, e.g., tongues press-cut and shaped or may be springs, which makes it possible to form a grid having plates of zirconium-base alloy and springs of "Inconel", having greater mechanical strength but on the other hand higher neutron absorption. The plates (or at least the internal plates 44, 46 and 48) may have a shape corrugated at the distribution spacing of the fuel rods when it is desired to reduce the spacing pitch.

Figure 4C:
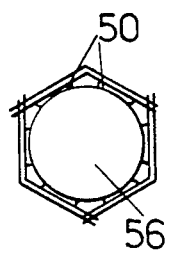
Figure 4D:
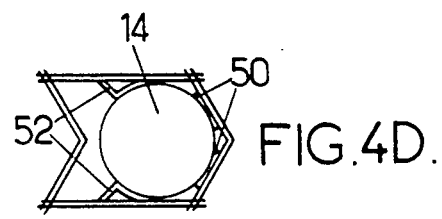

Bosses may be provided on all types of cells (diamond-shaped, herringbone, hexagonal). Support is less essential for the central hexagonal cell, for it is generally for an instrumentation tube. FIGS. 4A, 4B, 4C and 4D show, as examples, different bosses which may be used, formed by stamping and local pressing of the plates, in the form of buttons 50 (FIGS. 4A and 4D) or bridges 52 (FIGS. 4B and 4D). Bosses 50 may be provided on the wall of the central hexagonal cell for centering the instrumentation tube 56 (FIG. 4C).

The cells may be provided with means for holding the rods axially in position, which means are formed by springs added to the plates or stamped in the plates, as in the case of conventional grids.

The hexagonal cell shown schematically in FIGS. 5A and 5B comprises, in addition to bosses 52, a spring 58 formed by stamping a leg in a plate, shaping the stamped leg and end welding it at 60. Spring 58 could also be added. FIG. 6 shows a herringbone cell comprising two bosses 50 and two springs 58 which are added or formed by stamping. In all cases, the presence of spot welds or of a welding bead increases the mechanical strength of the grid.

In still another embodiment, shown in FIG. 7, a fuel rod 14 is held in position by springs 60 having the same form as the bridge-shaped bosses 52, but cut out. The same type of spring could be used in herringbone cells.

In most assemblies, some at least of the grids are provided with fins for mixing the coolant streams. The diamond-shaped cells as well as the herringbone cells of a grid in accordance to the invention may be thus equipped. FIG. 8 shows, by way of example, a diamond-shaped cell having two fins 62 formed as lugs attached to the plates, on one edge thereof, and bent. The area of such fins 62 may be greater than that found in grids where each cell is hexagonal, because the available space between the rod and the plate is greater. Such fins may be provided on cells also having bosses and/or springs for centering and/or holding the rods.

FIG. 9 shows, by way of example, the orientation and flow of the fluid streams obtained using fins of the kind shown in FIG. 8.

It will generally be advantageous to offset two successive grids 13 angularly by 60°, so that the fuel rods of a radial slow towards a corner of the grid, are alternately supported in a diamond-shaped cell and supported in a herringbone shaped cell.

I claim:

1. A grid comprising a belt of hexagonal shape and three sets of plates having ends secured to the belt, wherein the plates in each set are mutually parallel and cross the plates of the other two sets at an angle of 120°, and wherein all plates of all sets have the same length, have a 120° angle in the middle thereof and are parallel to only two respective successive sides of the belt.

2. Grid according to claim 1, wherein the plates of all three sets are mutually interlocked and constitute a single bed, and wherein said plates define rod centering cells, most of said cells being diamondshaped.

3. Grid according to claim 1, defining cells for centering and guiding fuel rods, wherein all said plates are smooth and planar.

4. Grid according to claim 1, wherein said belt consists of additional plates formed with openings receiving lugs projecting from end edges of said plates of said sets.

5. Grid according to claim 1, wherein said plates are provided with fuel rod centering means projecting from said plates into cells defined by said plates.

6. Grid according to claim 5, wherein said means comprise embossments pressed out in said plates.

7. Grid according to claim 5, wherein said means comprise individual springs secured to said plates.

8. Grid according to claim 6, wherein said embossments are formed as buttons or bridges.

9. Grid according to claim 1, wherein said plates are formed with flow mixing fins.

10. Nuclear fuel assembly of hexagonal cross-section devoid of external casing, having a skeleton consisting of two sub-structures wherein one of said sub-structures comprises a first end piece, a first plurality of mutually parallel guide tubes secured to said first end piece, a fuel rod supporting grid securely connected to said guide tubes and a plurality of fuel rod centering grids carried by said guide tubes, while the other sub-structure includes another end piece and a second plurality of mutually parallel guide tubes, said guide tubes being arranged for limiting the distance between the end tubes, and wherein each of said fuel rod centering grids comprises a belt of hexagonal shape and three sets of plates having their ends secured to the belt, the plates in each set being mutually parallel and at an angle of 120° with the plates of the other two sets and all plates of a same set having the same length, have a 120° angle in the middle thereof and are parallel to two respective successive sides of the belt.

* * * * *